US008206781B2

(12) United States Patent  (10) Patent No.: US 8,206,781 B2
Dicristofaro  (45) Date of Patent: Jun. 26, 2012

(54) METHOD OF MANUFACTURING A BALLOON

(76) Inventor: Vincent Dicristofaro, Wethersfield, CT (US)

( * ) Notice: Subject to any disclaimer, the term of this patent is extended or adjusted under 35 U.S.C. 154(b) by 0 days.

(21) Appl. No.: 12/945,054

(22) Filed: Nov. 12, 2010

(65) Prior Publication Data

US 2012/0118502 A1    May 17, 2012

(51) Int. Cl.
*B05D 1/14* (2006.01)
(52) U.S. Cl. .......................... 427/206; 427/462; 427/464
(58) Field of Classification Search ................. 427/206, 427/462, 464
See application file for complete search history.

(56) References Cited

U.S. PATENT DOCUMENTS 2,927,584 A * 3/1960 Wallace .................... 604/103.08
* cited by examiner

*Primary Examiner* — Frederick Parker
(74) *Attorney, Agent, or Firm* — Robert S. Smith

(57) ABSTRACT

The method of manufacturing a balloon which includes providing a web shaped material having first and second sides that is substantially impermeable to a gaseous substance; depositing a quantity of adhesive on the first side of the web shaped material; depositing flocking fibers in substantially perpendicular relationship to the first side of the web shaped material into the quantity of adhesive; and fabricating a balloon from the web shaped material with the first side thereof on the outside of the balloon envelope. In other embodiments the method of manufacturing a balloon includes forming a balloon from a web shaped material having first and second sides that is substantially impermeable to a gaseous substance, the first side of the web shaped material being the outside of the balloon; depositing a quantity of adhesive on the first side of the web shaped material; depositing flocking fibers in substantially perpendicular relationship to the first side of the web shaped material into the quantity of adhesive.

2 Claims, 1 Drawing Sheet

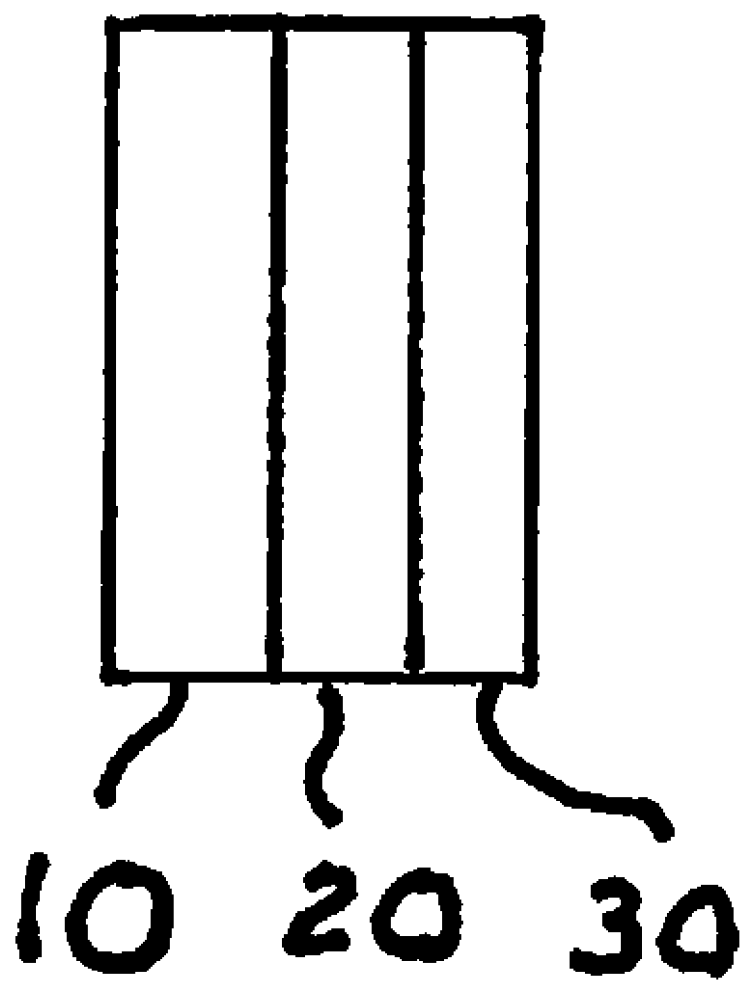

METHOD OF MANUFACTURING A BALLOON

FIELD OF THE INVENTION

The invention has particular application to methods and apparatus for producing novelties and particularly inflatable decorative balloons.

BACKGROUND OF THE INVENTION

A balloon is an inflatable flexible bag filled with a gas, such as helium, hydrogen, nitrous oxide or air. Modern balloons can be made from materials such as rubber, latex, polychloroprene, or a nylon fabric. Some balloons are used for decorative purposes, while others are used for practical purposes such as meteorology, medical treatment, military defense, or transportation. A balloon's properties, including low density and low cost, have led to a wide range of applications.

Historically party balloons were be have been mostly made of natural latex tapped from rubber trees, and were be filled with air, helium, water, or any other suitable liquid or gas. The rubber's elasticity makes the volume adjustable. Filling the balloon with air can be done with the mouth, a manual or electric inflator (such as a hand pump), or with a source of compressed gas.

Beginning in the late 1970's, some more expensive (and longer-lasting) foil balloons made of thin, inelastic, less permeable metalized plastic films started being produced. These balloons have shiny reflective surfaces and are often printed with color pictures and patterns for gifts and parties. The most important attribute of metalized nylon for balloons is its light weight, increasing buoyancy and its ability to keep the helium gas from escaping for several weeks. Foil balloons have been criticized for interfering with power lines.

Many novelty or party balloons are referred to as being manufactured of Mylar or metallized Mylar. More precisely, the material is a metallized BoPET (Biaxially-oriented polyethylene terephthalate) that is a polyester film made from stretched polyethylene terephthalate (PET) and is used for its high tensile strength, chemical and dimensional stability, transparency, reflectivity, gas and aroma barrier properties and electrical insulation. A variety of companies manufacture boPET and other polyester films under different brand names. In the US and Britain, the most well-known trademarks are Mylar, Melinex and Hostaphan.

The prior art includes insulated hot air balloons used to carry five or more persons in a basket suspended below the balloon. The balloon in this prior art is filled with steam instead of hot air to produce the buoyancy in the atmosphere. Steam has twice the load-bearing capacity of air; however, it necessitates insulation to prevent condensation from forming on the interior of the balloon envelope. For this purpose, flock insulation is bonded to a light but sensitive carrier foil.

A membrane flock insulating material was used to construct an insulated steam balloon. More particularly, a light metallized base fabric in combination with a membrane flock insulating material captures a layer of air by means of vertically oriented raised fibers on the base membrane. This membrane with its spacing elements is known as the spacing layer. The gap is closed by a covering layer. The insulting effect is determined by the width of this space, the flock pattern and the surface characteristics of the spacing and covering layers. The membrane flock insulating material is purported to be extremely light, highly reflective, mildly heat-reflective, temperature-resistant, compressible, readily adaptable to individual requirements and easily optimized by means of adjusting the spacing gap and the number of layers. High compressibility is a fundamental requirement, since balloons are packed and transported after a flight.

The lightweight insulation in this prior art is situated on the interior of the envelope, where it is protected against the adverse effects of everyday handling; this insulation in turn protects the load-bearing envelope against the effects of high temperatures. Higher temperatures than usual are encountered on the inner surface of the insulating material, while the cooler exterior of the envelope radiates less heat. This prior art material does not have any relevance to the exterior surface, the appearance, the electrical conductivity or reflectivity of a balloon.

A problem with the prior art party balloons, particularly or foil balloons is the reflectivity seriously interferes with pictures being taken by photographers. This problem is particularly acute at parties because partygoers routinely take many pictures.

Another problem with metallized or foil balloons is that they may short-circuit various electric circuits. This concern is not an idle or academic issue. For example, on Mar. 10, 1945, a balloon descended in the vicinity of the Manhattan Project's production facility at the Hanford, CA Site. This balloon caused a short circuit in the power lines supplying electricity for the nuclear reactor cooling pumps. Although, backup systems did function properly the chain of events does illustrate the dangers.

SUMMARY OF THE INVENTION

It is an object of the present invention to produce a novelty or party balloon having unique aesthetic characteristics.

Another object of the present invention is to produce a novelty or party balloon that avoids the reflectivity inherent in prior art balloons and thus enables photographers to more freely produce quality photographs.

Still another object of the invention is to produce a novelty or party balloon that will minimize the risk of short-circuiting other apparatus.

Still another object of the invention is to provide a novelty or party balloon that is simple and inexpensive to manufacture.

It has now been found that these and other objects of the present invention may be attained in the method of manufacturing a balloon which includes providing a web shaped material having first and second sides that is substantially impermeable to a gaseous substance; depositing a quantity of adhesive on the first side of the web shaped material; depositing flocking fibers in substantially perpendicular relationship to the first side of the web shaped material into the quantity of adhesive; and fabricating a balloon from the web shaped material with the first side thereof on the outside of the balloon envelope.

In some embodiments of the present invention the step of providing a web shaped material includes providing a metallized biaxially-oriented polyethylene terephthalate. Similarly, in some embodiments depositing the flocking fibers is achieved by the application of a high-voltage electric field; the "flock" is given a negative charge and the web shaped material is grounded.

The method of manufacturing a balloon which include forming a balloon from a web shaped material having first and second sides that is substantially impermeable to a gaseous substance, the first side of the web shaped material being the outside of the balloon; depositing a quantity of adhesive on the first side of the web shaped material; depositing flocking fibers in substantially perpendicular relationship to the first side of the web shaped material into the quantity of adhesive.

In some embodiments of the method the step of forming a balloon includes providing a web shaped material is a metallized biaxially-oriented polyethylene terephthalate. The step of depositing the flocking fibers may the achieved by the application of a high-voltage electric field and the "flock" is given a negative charge and the web shaped material is grounded.

BRIEF DESCRIPTION OF THE DRAWING

The invention will be better understood by reference to the accompanying drawing having a diagrammatic representation of the cross section of a balloon in accordance with the present invention having respective layers.

DESCRIPTION OF THE PREFERRED EMBODIMENTS

Flocking is the process of depositing many small fiber particles (called flock) onto a surface. It can also refer to the texture produced by the process, or to any material used primarily for its flocked surface. Flocking of an article can be performed for the purpose of increasing its value in terms of the tactile sensation, aesthetics, color and appearance. It can also be performed for functional reasons including insulation, slip-or-grip friction, and low reflectivity. Currently the application of the fine particles to an adhesive coated surface is usually done by the application of a high-voltage electric field. In a flocking machine the "flock" is given a negative charge while the substrate is grounded. Flock material flies vertically onto the substrate attaching to previously applies glue.

A major part of the flocking done worldwide uses finely cut natural or synthetic fibers. Often the fibers are nylon, rayon or polyester. A flocked finish imparts a decorative and/or functional characteristic to the surface similar to the feel of velvet. The varieties of materials that are applied to numerous surfaces through different flocking methods create a wide range of end products. The flocking process is used on items ranging from retail consumer goods to products with high technology military applications.

A significant problem inherent in applying flocking to balloons is the impact on the buoyant properties of the inflatable balloon. Too much flocking material on one side may result in a balloon that floats with that side downward at all times. Even more flocking material applied to one or both sides will result in a balloon that will not float in the air at any time.

A wide range of flocking machinery exists for a variety of applications, however the process fundamentally remains the same.

Step 1 Pre-treatment of the substrate (where necessary)
Step 2 Adhesive application
Step 3 Flock application
Step 4 Preliminary cleaning (removal of excess flock by suction)
Step 5 Drying/curing of adhesive
Step 6 Final cleaning (removal of excess flock by suction, brushing and/or beating)

Electrostatic flocking utilizes an electric charge to orient fibers and promote their perpendicular alignment. This technique optimizes the results obtained with longer fiber.

In this method, the adhesive coated substrate passes through a high voltage electrostatic field. An electrode is utilized to give the flock fiber a charge. The charged fibers become aligned with the electric field lines of force and are attracted to the grounded electrode. The flock moves towards the adhesive coated substrate and becomes embedded. Fibers adhere in perpendicular relationship to the surface giving a dense, pile finish. The electrostatic flocking method can be enhanced with pneumatic techniques for good coverage on three dimensional objects such as inflated balloons.

Mechanical fiber-coating on flat surfaces is usually achieved using the beater-bar method. This technique involves the passage of an adhesive coated substrate over a series of polygonal rollers that rapidly rotate to vibrate the substrate. The vibration is used to drive the fiber into the adhesive. Fibers are applied by gravity onto the substrate. Pneumatic flocking applies flock in a directed airstream. This method is most commonly used to coat three dimensional objects such as automotive glove boxes.

The process for manufacturing novelty and party balloons in accordance with the present invention may involve a flocking process on sheet stock from which the balloon product will be subsequently manufactured. Alternatively, flocking process may occur after the balloon has been fabricated. Ordinarily the fibers deposited on sheet stock will be more uniformly positioned and thus a higher quality product is achieved. A disadvantage of performing the flocking process on sheet stock is that there is some waste due to the deposition of fibers on portions of the sheet stock that is discarded in the final fabrication process.

Referring now to the drawing there is shown a diagrammatic representation of the cross section of a balloon in accordance with the present invention having respective layers—a layer of adhesive 20, a layer 30 of fibers disposed in generally perpendicular relationship to the material 10 such as boPET and other polyester films. The fibers 30 are retained on the material 10 by the adhesive 20. The layers collectively constitute the wall of the balloon.

Particular care must be taken to deposit the same fiber mass on respective sides of the party balloon to enable the balloon when filled with a gas lighter than air to maintain an upright position. The method an article of manufacture in accordance with the present invention includes balloons that are substantially spherical as well as those that may have a circular cross section and opposed sides that are extensively planar.

Thus it will be understood that the method and article of manufacture in accordance with the present invention produces a novelty or party balloon having unique aesthetic characteristics, enables photographers to more freely produce quality photographs, minimize the risk of short-circuiting other apparatus, and in addition is simple and inexpensive to manufacture.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Although, the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. The method of manufacturing a balloon which comprises:
   providing a web shaped material having first and second sides that is substantially impermeable to a gaseous substance;
   depositing a quantity of adhesive on the first side of the web shaped material;
   depositing flocking fibers in substantially perpendicular relationship to the first side of the web shaped material into the quantity of adhesive; and
   fabricating a balloon from the web shaped material with the first side thereof on the outside of the balloon envelope wherein the step of providing a web shaped material includes providing a metallized biaxially-oriented polyethylene terephthalate.

2. The method of manufacturing a balloon which comprises:
   forming a balloon from a web shaped material having first and second sides that is substantially impermeable to a gaseous substance, the first side of the web shaped material being the outside of the balloon;
   depositing a quantity of adhesive on the first side of the web shaped material;
   depositing flocking fibers in substantially perpendicular relationship to the first side of the web shaped material into the quantity of adhesive wherein the step of forming a balloon includes providing a web shaped material is a metallized biaxially-oriented polyethylene terephthalate.

* * * * *